May 15, 1923.
C. SCHEUNER
1,455,412
ARMORED PNEUMATIC TIRE
Filed Jan. 17, 1922    2 Sheets-Sheet 1
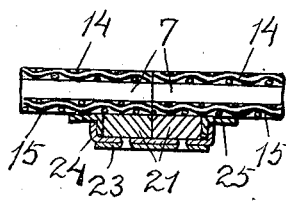
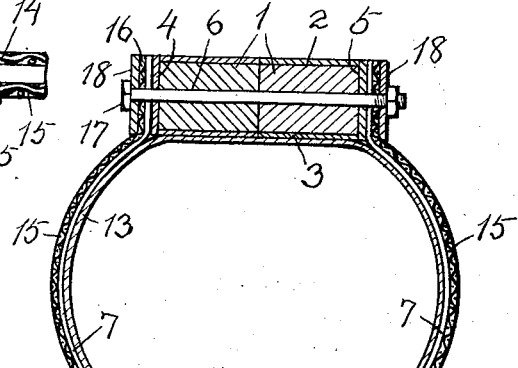
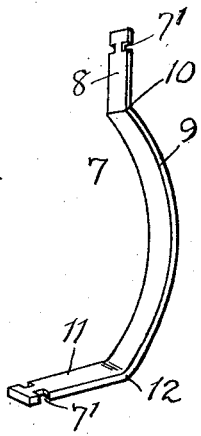
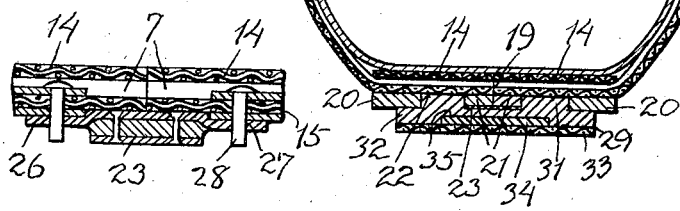
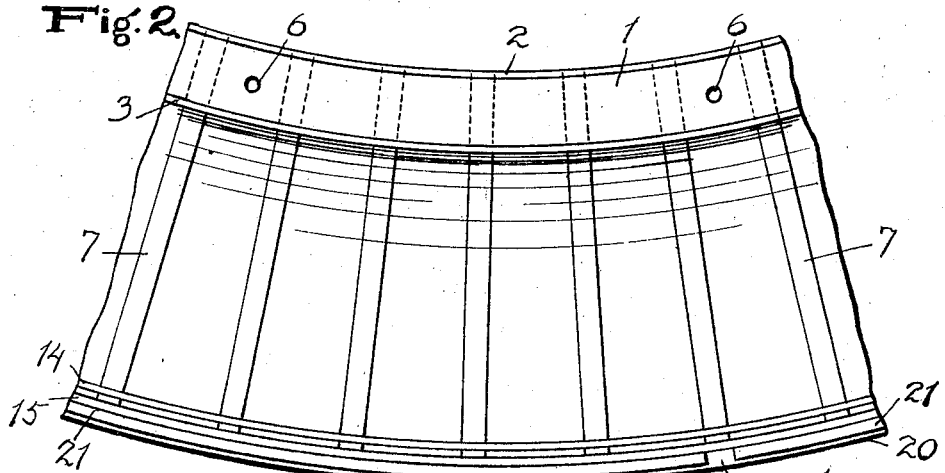
Inventor
Charles Scheuner
by E. W. Anderson
Attorneys May 15, 1923.

C. SCHEUNER 1,455,412

ARMORED PNEUMATIC TIRE

Filed Jan. 17, 1922

Inventor
Charles Scheuner
by E. W. Anderson Jr.
Attorney

Patented May 15, 1923.

1,455,412

UNITED STATES PATENT OFFICE.

CHARLES SCHEUNER, OF CHICAGO, ILLINOIS.

ARMORED PNEUMATIC TIRE.

Application filed January 17, 1922. Serial No. 529,887.

*To all whom it may concern:*

Be it known that I, CHARLES SCHEUNER, a citizen of the United States, resident of Chicago, in the county of Cook and State of Illinois, have made a certain new and useful Invention in Armored Pneumatic Tires; and I declare the following to be a full, clear, and exact description of the same, such as will enable others skilled in the art to which it appertains to make and use the invention, reference being had to the accompanying drawings and to letters or figures of reference marked thereon, which form a part of this specification.

Figure 1 is a transverse section of the invention on the line 1—1, Figure 7.

Figure 2 is a detail fragmentary side view of one of the longitudinal halves of the casing.

Figure 3 is a detail perspective view of one of the springs.

Figure 7:
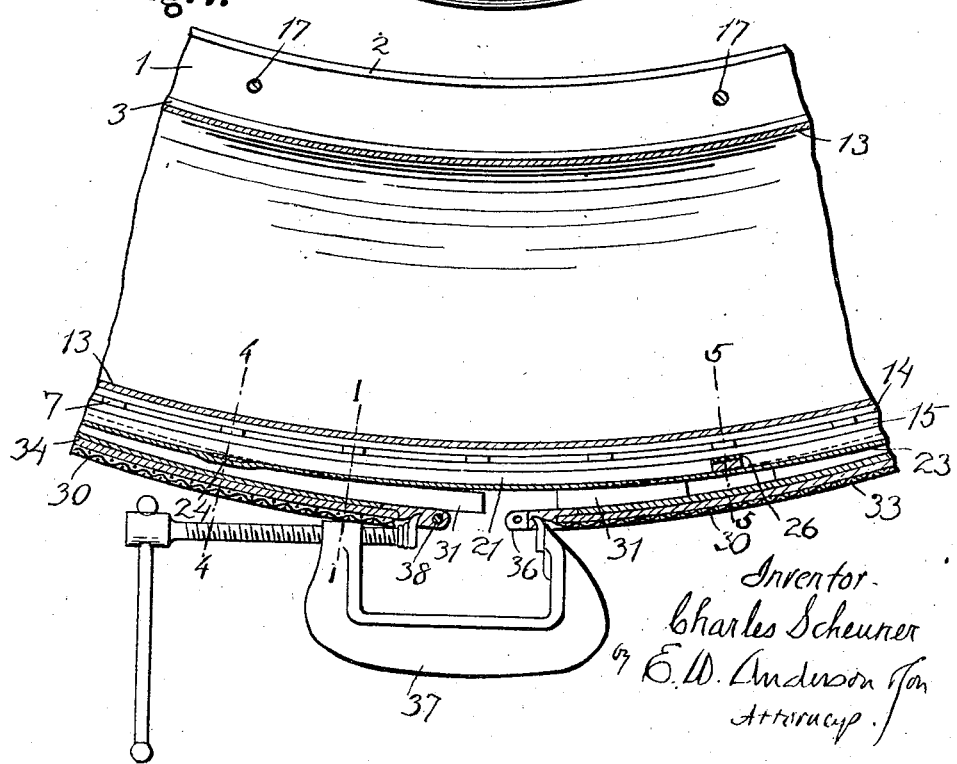

Figures 4 and 5 are detail cross sectional views of the tread portion of the casing, showing the means for connecting the two halves thereof and taken respectively on the lines 4—4 and 5—5, Figure 7.

Figure 6:
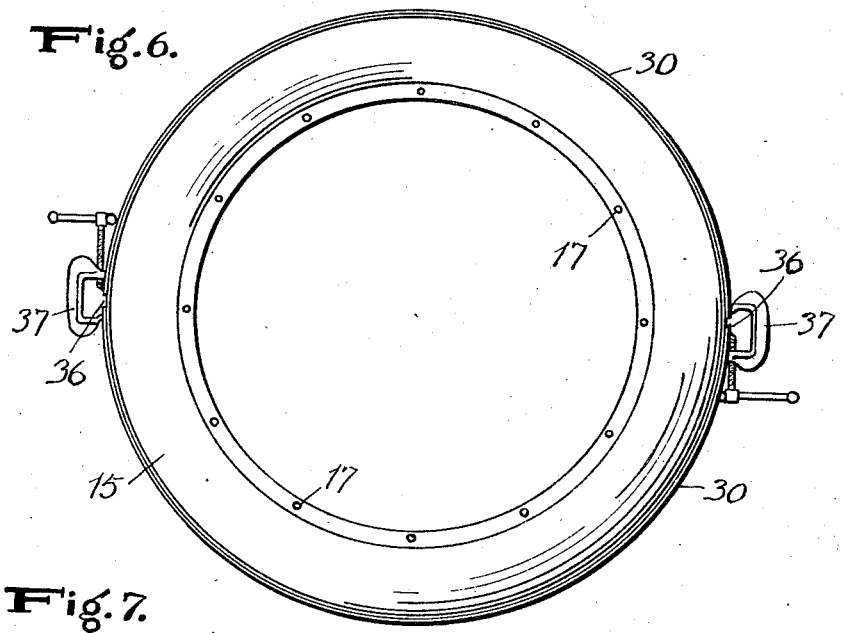

Figure 6 is a side view of the tire showing the clamps in position to draw the two sections of the tread together.

Figure 7 is a detail longitudinal sectional view showing the application of one of these clamps.

The invention has relation to armored or puncture proof pneumatic tires, having for an object to provide such a tire that may be mounted upon the wheels of automobiles in the customary manner, and wherein the resiliency of the tire will be preserved, the inner tube partially relieved of strain, and effective armor combined therewith. Other objects and advantages will appear from the following description.

The invention consists in the novel construction and combinations of parts, as hereinafter set forth.

In the accompanying drawings illustrating the invention, the numeral 1, designates the rim of the tire, made up in two annular sections, usually of wood, and bounded by annular metal plates, 2, 3, 4, and 5, the lateral plates 4 and 5 and the said sections being transversely perforated at 6, for reasons that will be stated.

7 designates the members of an annular series of metallic springs, made of very thin steel, and consisting each of an inner vertical straight portion 8, a concavo-convex or arcuate portion 9, having an obtuse angle bend 10, joining it with said straight portion, and a horizontal outer portion 11, having an obtuse angle bend 12, connecting it with said arcuate portion, there being two annular series of said springs, the arcuate portions of the springs of the two series projecting laterally and in opposite directions, and the horizontal outer portions of the springs of the two series projecting towards each other, and meeting at their free ends.

The inner tube 13 of the tire is located within and inclosed by the two series of springs and the said rim, and located between the horizontal outer portions of the said springs and the tread portion of the inner tube is an annular strip 14 of leather or fabric, serving to protect the inner tube from abrasion by the overlying springs at the tread portion of the said tube.

15 designates what may be termed the casing of the tire, the inner annular portions 16 of which are secured to the rim of the tire by means of transverse bolts 17 engaging the perforations of said rim and of said annular plates, outer annular plates 18 being located on the outer side of the portions 16 of the casing, and being perforated to engage the said bolts and affording a bearing for the heads of said bolts and the nuts thereof, and thereby protecting the said casing.

The casing 15 incloses the two series of springs 7, and completes the tire, except for certain additions to render the tire armored and water proof, and which will now be described.

The casing 15 is preferably divided centrally and longitudinally into two annular halves or sections, the dividing line being shown at 19, and carried by the outer circumference of each half of the casing are outer annular ribs 20 and inner annular ribs 21 also, the inner strips of the two halves of the casing meeting at the longitudinal center of the tire, and being respectively separated from its related outer annular rib by an annular groove 22.

In order to connect the two halves of the casing and thereby hold the tire, including the two annular series of springs the inner tube and the intermediate strip, compactly together, an elastic band 23 also annular in form overlies the middle or inner strips 21, and is provided at intervals with metal angle pieces 24 embracing the strips 21, and engaging metal strips 25 to take the wear and strain. For the same reason, i. e. to connect the two halves of the tire and to prevent the said halves from moving either annularly or laterally relative to each other, the said elastic band is provided at intervals with transverse metal strips or ties 26 having end perforations 27 engaging vertical studs 28 of the tread portion of each half of the tire, said transverse strips 26 fitting closely within transverse recesses 27, the latter dividing the inner strips 21 into arcuate portions, and further preventing any slippage of the two sections of the tire annularly relative to each other.

The tread 29 of the tire is composed of arcuate sections 30 and is provided with an annular circumferential groove engaging the ribs 20 of the casing halves and with annular circumferential ribs 31 bounding said groove and located at the outer sides of the ribs 21 and within the grooves 22 aforesaid, said tread having annular marginal portions 32 resting upon the ribs 20 of said halves, the groove and the ribs of said tread and the grooves and the ribs of the casing halves being adapted for engagement with each other by a vertical movement of the sections of the tread towards each other. This tread is provided with an outer annular covering of fabric or the like shown at 33, and located below said fabric is an annular metal plate 34, also made up in arcuate sections one of which is carried by each arcuate section of the tread. The metal plate 34 fits within an annular recess 35 of the tread.

As a means of preventing any circumferential or annular movement of the tread 29 upon the tire proper, the arcuate sections are hinged together at 36, and are drawn together by clamps 37 or the like, before the insertion of the hinge pins 38, the latter holding the arcuate tread sections in complete annular form.

The springs 7 are suitably secured to the casing 15, as for instance by notching the ends of the springs at 7', and engaging suitable fastening means with said notches and with the casing.

The elastic band 23 has the further function of sealing the joint of the two halves of the tire against entrance of water or dust.

The annular series of arcuate springs are secured, each series to the related half of the casing, so that when the connecting and sealing means or band is removed, and the casing halves are separated, the springs will be carried therewith.

It will be noted that the tire is sealed against the entrance of dust and moisture. It will also be noted that the springs 7 may be omitted if desired.

I claim:—

1. In a pneumatic tire, the combination with an inner tube, of an annular tubular casing composed of two annular longitudinal concavo-convex halves meeting along their outer circumferential edges and provided each with annular circumferential spaced ribs and annular grooves therebetween, and connecting means for said halves including an outer tread composed of arcuate sections having spaced ribs and an annular groove therebetween engaging the inner of the ribs and the grooves of said casing halves, said tread having annular marginal portions resting upon the outer of the ribs of the casing halves.

2. In a pneumatic tire, the combination with an inner tube, of an annular tubular casing composed of two annular longitudinal concavo-convex halves meeting along their outer circumferential edges and provided each with annular circumferential spaced ribs and annular grooves therebetween, and connecting means for said halves including an outer tread composed of arcuate sections having spaced ribs and an annular groove therebetween engaging the inner of the ribs and the grooves of said casing halves, said tread having annular marginal portions resting upon the outer of the ribs of the casing halves, the groove and the ribs of said tread and the grooves and the ribs of the casing halves being adapted for engagement with each other by a vertical movement of the sections of the tread towards each other.

3. In a pneumatic tire, the combination with an inner tube, of an annular tubular casing composed of two annular longitudinal concavo-convex halves meeting along their outer circumferential edges and provided each with annular circumferential spaced ribs and annular grooves therebetween, and connecting means for said halves including transverse ties having vertical pin and socket egagement with said halves, and an outer tread composed of arcuate sections having spaced ribs and an annular groove therebetween engaging the inner of the ribs and the grooves of the casing halves, said tread having annular marginal portions resting upon the outer of the ribs of the casing halves.

4. In a pneumatic tire, the combination with an inner tube, of an annular tubular casing composed of two annular longitudinal concavo-convex halves meeting along their outer circumferential edges and provided each with annular circumferential spaced ribs and annular grooves therebetween, and connecting means for said halves including an annular strip bridging the joint of said halves and carrying transverse ties having vertical pin and socket engagement with said halves and angular ties engaging the ribs of said halves, and an outer tread composed of arcuate sections having spaced ribs and an annular groove therebetween engaging the inner of the ribs and the grooves of the casing halves, said tread having annular marginal portions resting upon the outer of the ribs of the casing halves.

5. In a pneumatic tire, the combination with an inner tube, of an annular tubular casing composed of two annular longitudinal concavo-convex halves meeting along their outer circumferential edges and provided each with annular circumferential spaced ribs and annular grooves therebetween, resilient springs adapted to take a portion of the strain of the load and related to each of said halves, and connecting means for said halves including an outer tread composed of arcuate sections having spaced ribs and an annular groove therebetween engaging the inner of the ribs and the grooves of said casing halves, said tread having annular marginal portions resting upon the outer of the ribs of the casing halves.

In testimony whereof I affix my signature in presence of two witnesses.

CHARLES SCHEUNER.

Witnesses:
J. W. ALLERSON,
H. D. LIES.